(12) United States Patent
Stammers et al.

(10) Patent No.: US 7,082,121 B1
(45) Date of Patent: Jul. 25, 2006

(54) SYSTEM, DEVICE, AND METHOD FOR INTERWORKING BETWEEN A BROADBAND SS7 NETWORK AND AN INTERNET PROTOCOL NETWORK TO PROVIDE TRANSPORT OF CONNECTION ORIENTED INFORMATION

(75) Inventors: Timothy P. Stammers, Raleigh, NC (US); Michael A. Wright, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

(21) Appl. No.: 10/020,633

(22) Filed: Dec. 13, 2001

(51) Int. Cl.
*H04L 12/66* (2006.01)
(52) U.S. Cl. .................. 370/352; 370/401; 370/395.1
(58) Field of Classification Search ............... 370/352, 370/401, 395.1
See application file for complete search history.

(56) References Cited

U.S. PATENT DOCUMENTS

| 6,377,799 | B1 | 4/2002 | Hameleers et al. | 455/426 |
|---|---|---|---|---|
| 6,519,458 | B1 | 2/2003 | Oh et al. | 455/445 |
| 6,731,629 | B1 | 5/2004 | Patel et al. | 370/356 |
| 6,760,343 | B1 | 7/2004 | Krishnamurthy et al. | 370/466 |
| 6,885,658 | B1 | 4/2005 | Ress et al. | 370/352 |
| 6,963,582 | B1 | 11/2005 | Xu | 370/466 |
| 2001/0053145 | A1* | 12/2001 | Willars et al. | 370/352 |
| 2002/0075900 | A1* | 6/2002 | Turina et al. | 370/467 |
| 2002/0105969 | A1* | 8/2002 | Benedyk et al. | 370/466 |
| 2002/0131427 | A1* | 9/2002 | Niermann | 370/401 |

\* cited by examiner

*Primary Examiner*—Derrick Ferris
(74) *Attorney, Agent, or Firm*—Baker Botts L.L.P.

(57) ABSTRACT

A wireless communication system includes a radio node controller in an SS7 network that generates SS7 formatted information for transport in an Asynchronous Transfer Mode Permanent Virtual Circuit in response to communications with a mobile unit. A signaling gateway receives the SS7 formatted information on the Asynchronous Transfer Mode Permanent Virtual Circuit. The signaling gateway translates the SS7 formatted information into Internet Protocol information and maps the Asynchronous Transfer Mode Permanent Virtual Circuit to stream control transmission protocol endpoint and stream. A mobile switching center in an Internet Protocol network receives the Internet Protocol formatted information on the Stream Control Transmission Protocol stream and performs further processing thereof. By associating Asynchronous Transfer Mode Permanent Virtual Circuits with Stream Control Transmission Protocol endpoints and streams, the signaling gateway need not maintain connection states in order to allow a back up signaling gateway to continue passing information between the radio node controller and the mobile switching center in the event of a failure in the signaling gateway.

23 Claims, 1 Drawing Sheet

SYSTEM, DEVICE, AND METHOD FOR INTERWORKING BETWEEN A BROADBAND SS7 NETWORK AND AN INTERNET PROTOCOL NETWORK TO PROVIDE TRANSPORT OF CONNECTION ORIENTED INFORMATION

TECHNICAL FIELD OF THE INVENTION

The present invention relates in general to communications networks and more particularly to a system, device, and method for interworking between a broadband SS7 network and an Internet Protocol network to provide transport of connection oriented information.

BACKGROUND OF THE INVENTION

Interworking of SCCP connection oriented services between broadband Signaling Service No. 7 (SS7) networks and a network built on the principles of SIGTRAN currently requires the establishment of linked SCCP and SUA connection sections. In order to do this, connection states must be provided in a signaling gateway. If the signaling gateway fails, the connections will be lost as well as the state information. As the connections are lost, services using those connections may be terminated. In a mobile cellular network environment, stable calls will be lost as a result of the signaling gateway failure and connections must be re-established. Synchronizing connection states among redundant and backup signaling gateways is a complicated and expensive undertaking. Therefore, it is desirable to preserve SCCP connections during a signaling gateway failure and switching to an alternate signaling gateway in order to preserve stable calls.

SUMMARY OF THE INVENTION

From the foregoing, it may be appreciated by those skilled in the art that a need has arisen for a technique to interwork SS7 formats and Internet Protocol formats when communicating between a SS7 network and an Internet Protocol network without having to keep track of connection states. In accordance with the present invention, a system, device, and method for interworking between a broadband SS7 network and an Internet Protocol network to provide transport of connection oriented information are provided that substantially eliminate or greatly reduce disadvantages and problems associated with conventional interworking techniques.

According to an embodiment of the present invention, there is provided a system for interworking between a broadband SS7 network and an Internet Protocol network to provide transport of connection oriented information that includes a radio node controller in the SS7 network generating SS7 formatted information for transport in an asynchronous transfer mode permanent virtual circuit in response to communications with a mobile unit. A signaling gateway receives the SS7 formatted information on the asynchronous transfer mode permanent virtual circuit and maps the SS7 formatted information into Internet Protocol formatted information. The signaling gateway transports the Internet Protocol formatted information on a Stream Control Transmission Protocol stream associated with the asynchronous transfer mode permanent virtual circuit. A mobile switching center in the Internet Protocol network receives the Internet Protocol formatted information on the Stream Control Transmission Protocol stream and performs further processing thereof. The signaling gateway associates asynchronous transfer mode permanent virtual circuits carrying SS7 formatted information with Stream Control Transmission Protocol streams carrying Internet Protocol formatted information. The mapping is performed without any tracking of the connection state between the radio node controller in the SS7 network and the mobile switching center in the Internet Protocol network.

The present invention provides various technical advantages over conventional interworking techniques. For example, one technical advantage is to use predefined parameter mappings in order to translate between SS7 formatted information and Internet Protocol formatted information. Another technical advantage is to associate asynchronous transfer mode permanent virtual circuits carrying SS7 formatted information with SCTP endpoints and streams carrying Internet Protocol formatted information. Yet another technical advantage is to perform the mapping without maintaining connection related state at the signaling gateway. Still another technical advantage is to transparently insert a redundant or alternate signaling gateway without affecting network operation in response to a failure in the primary signaling gateway. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
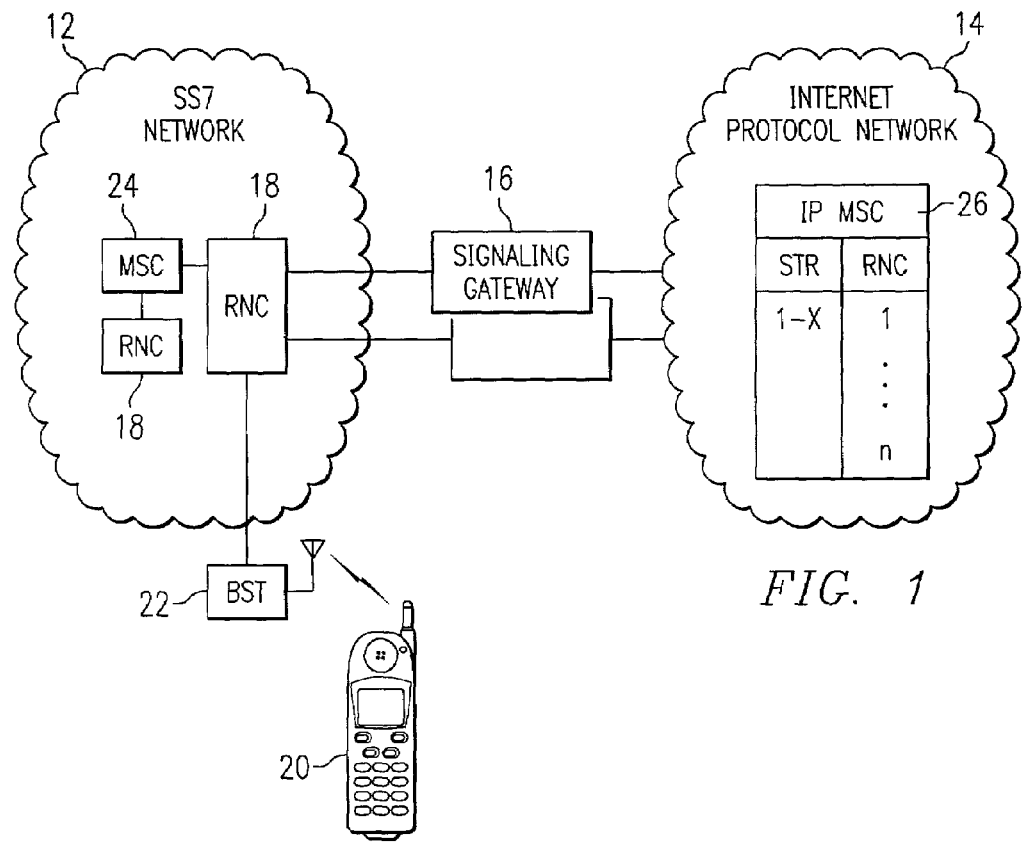
FIG. 1 illustrates a block diagram of a wireless communication network.

FIG. 1 is a simplified block diagram of a wireless communication network 10. Wireless communication network 10 includes a SS7 network 12 and an Internet Protocol network 14 coupled by a signaling gateway 16.

SS7 network 12 includes a plurality of radio node controllers 18 that provide control of wireless communications from users 20 through base station transceivers 22. A mobile switching center 24 provides administrative and supervisory control for radio node controllers 18. SS7 network 12 provides a separate control messaging overlay function using high speed out of band links. The out of band links deliver control related messages to enable switching elements to quickly communicate call related control information necessary to establish, bill, and terminate connections.

Internet Protocol network 14 provides a packet oriented efficient delivery of data among devices sharing a network that is dynamically configured and designed to be self learning and self healing rather than centrally managed. Data is partitioned into manageable sized pieces, known as packets, that include the address of the sender and the receiver. These packets travel within Internet Protocol network 14 dynamically along one of many possible paths. Internet Protocol network 14 includes its own mobile switching center 26 for processing packets with information originating from a radio node controller 18. Different packets from the same source going to the same destination may travel along different paths and arrive in a random order. Most applications in Internet Protocol network 14 are based on a distributed model relying on cooperating distributed elements in an open architecture as opposed to a closed centralized system. Internet Protocol network 14 is typically not regulated by governmental bodies, adding to its appeal but also enhancing its perils due to ease of access for bugs, viruses, and other unwelcome intruders.

Signaling gateway 16 provides a bi-directional interface between SS7 network 12 and various call control related elements in Internet Protocol network 14. Signaling gateway 16 maps SS7 formatted information into a format understood by elements in Internet Protocol network 14. Signaling gateway 16 also maps Internet Protocol formatted information into a format understood by elements in SS7 network 12. An appropriate status of all elements in Internet Protocol network 14 is reported to SS7 network 14 by signaling gateway 16. The SS7 network 14 view of associated device availability in Internet Protocol network 14 is coordinated by signaling gateway 16. Signaling gateway 16 implements highly reliable SS7 messaging that obeys all the rules of SS7 network 12 while also accommodating a variety of behaviors in Internet Protocol network 14. To enable Internet Protocol network 14 elements to perform their designated administrative functions, signaling gateway 16 repackages information contained in various high level SS7 message protocols into formats understood by the elements of Internet Protocol network 14. Since several variants of SS7 protocols exist, it is desirable for signaling gateway 16 to understand each variant and minimize the amount of variation presented to elements within Internet Protocol network 14. Also, signaling gateway 16 should filter out inappropriate traffic to protect SS7 network 12 from malicious intrusion or accidentally induced undesirable traffic as a result of Internet Protocol network 14 being a shared medium possibly lacking physical security.

Figure 2:
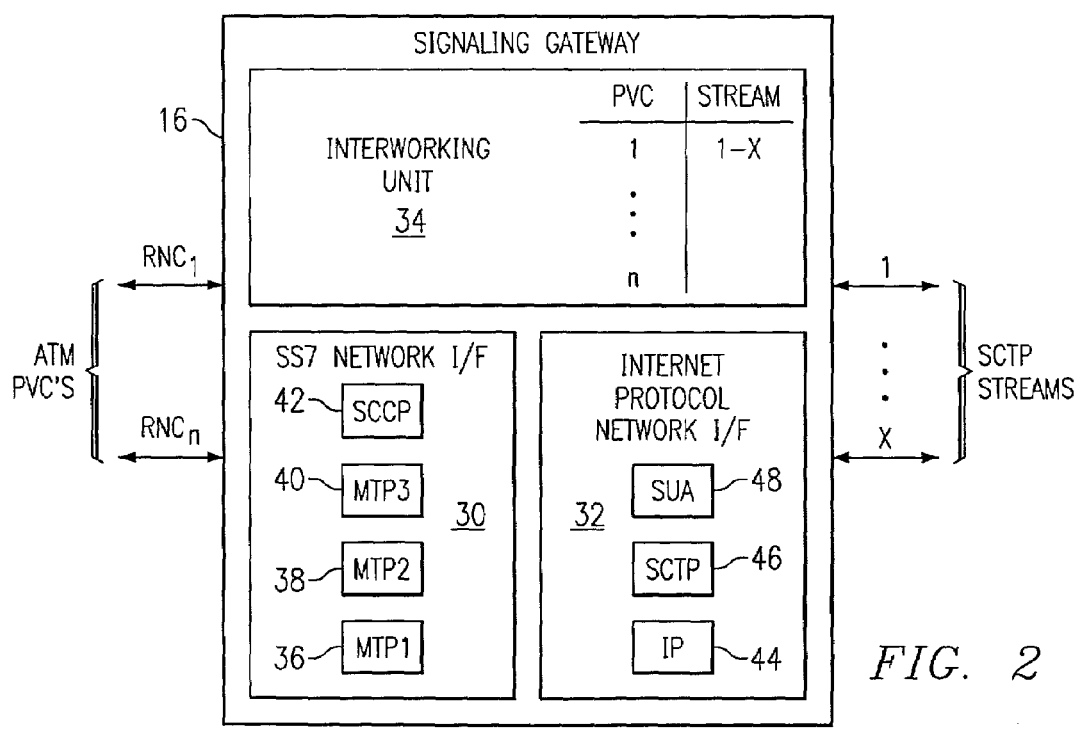
FIG. 2 illustrates a block diagram of a signaling gateway in the wireless communication network.

FIG. 2 shows the software makeup of signaling gateway 16. Signaling gateway 16 includes a SS7 network interface 30, an Internet Protocol network interface 32, and an interworking module 34 to provide information transfer therebetween. SS7 network interface 30 may include Message Transfer Part Level 1 module 36, Message Transfer Part Level 2 module 38, Message Transfer Part Level 3 module 40, Signaling Connection Control Part (SCCP) module 42. Internet Protocol network interface 32 may include Internet Protocol module 44, Stream Control Transmission Protocol (SCTP) module 46, and SCCP—User Adaptation Layer (SUA) module 48. SUA module 48 processing transports signaling messages from SCCP users, to include Radio Access Network Application Part (RANAP) provided by radio node controllers 18 as well as Transaction Capabilities Application Part (TCAP), over Internet Protocol network 14 using SCTP module 46 processing.

Interworking module 34 performs a parameter mapping between SCCP and SUA formats combined with a relay function based on SCCP or MTP level addressing. Through this parameter mapping and relay function, signaling gateway 16 does not need to perform any connection state maintenance. Interworking module 34 uses mappings between Asynchronous Transfer Mode (ATM) Permanent Virtual Circuits (PVC) carrying SS7 signaling traffic and an SCTP association and stream carrying Internet Protocol related traffic. Connection source and destination references are transferred without modification between SUA and SCCP formats. Alternative or redundant signaling gateways 16 also include the appropriate mapping function in order to allow for continued system and network operation in an event of a failure in a signaling gateway 16. In the event of a failure in a signaling gateway 16, the change to a different signaling gateway is transparent to the source and destination endpoints associated with the SUA—SCCP mapping.

In operation, each radio node controller 18 has a predefined asynchronous transfer mode permanent virtual circuit connection with signaling gateway 16. Thus, each radio node controller may be uniquely identified by its asynchronous transfer mode permanent virtual circuit. Interworking module 34 includes a table to map each asynchronous transfer mode permanent virtual circuit to an SCTP endpoint and stream. Mobile switching center 26 in Internet Protocol network 14 includes a table to associate a particular SCTP endpoint and stream with a particular radio node controller 18 in order to provide effective information transfer between mobile switching center 26 in Internet Protocol network 14 and a number of radio node controllers 18 in SS7 network 12. A request message for a connection from a radio node controller 18 includes an originating reference value that is sent to mobile switching center 26. Mobile switching center 26, if willing to establish a connection with radio node controller 18, will return a connection confirm response message including a responding reference value. Once the connection is established in this manner, subsequent messages from radio node controller include the responding reference value and subsequent response messages from mobile switching center 26 will include the originating reference value. The originating reference value and the responding reference value act as an identifier for the established connection between radio node controller 18 and mobile switching center 26 and provide for coordination of the connection established between them.

After a connection is established, radio node controller 18 generates SS7 formatted information for transport over its asynchronous transfer mode permanent virtual circuit connection with signaling gateway 16. Signaling gateway 16 receives the SS7 formatted request information and performs appropriate Message Transfer Part and SCCP processing using MTP Level 1 module 36, MTP Level 2 module 38, MTP Level 3 module 40, and SCCP module 42. Interworking module 34 maps the SS7 formatted request information in SCCP messages into Internet Protocol formatted request information in SUA messages. Interworking module 34 also identifies a SCTP endpoint and stream associated with the incoming asynchronous transfer mode permanent virtual circuit to be used for transporting the Internet Protocol formatted request information. Signaling gateway 16 then performs appropriate processing using SUA module 48, SCTP module 46, and Internet Protocol module 44 prior to sending the Internet Protocol formatted request information on the identified SCTP endpoint and stream.

Mobile switching center 26 in Internet Protocol network 14 receives the Internet Protocol formatted request information on the identified SCTP endpoint and stream. Mobile switching center 26 performs appropriate processing on the Internet Protocol formatted request information and generates appropriate Internet Protocol response information in response thereof. Mobile switching center 26 then selects an SCTP endpoint and stream associated with the originating radio node controller for transport of the Internet protocol response information.

Signaling gateway 16 receives the Internet Protocol formatted response information on the selected SCTP endpoint and stream and performs appropriate processing using Internet Protocol module 44, SCTP module 46, and SUA module 48. Interworking module 34 maps the Internet Protocol formatted information into SS7 formatted request information. Interworking module 34 then identifies the asynchronous transfer mode permanent virtual circuit associated with the selected SCTP endpoint and stream for transport of the SS7 formatted response information. After appropriate processing by SCCP module 42, MTP Layer 3 module 40, MTP Layer 2 module 38, and MTP Layer 1 module 36, signaling gateway 16 sends the SS7 formatted response information to originating radio node controller 18 on the identified permanent virtual circuit.

Signaling gateway 16 can handle information flow to and from many radio node controllers 18, as well as other elements, within SS7 network 12. Similarly, signaling gateway 16 can handle information flow to and from mobile switching center 26, as well as other elements, within Internet Protocol network 14. Through asynchronous transfer mode permanent virtual circuit and SCTP endpoint and stream associations, signaling gateway 16 provides a path for information transfer between SS7 network 12 and Internet Protocol network 14. These associations are also maintained in alternate or backup signaling gateways so that a path can be maintained between a radio node controller 18 and mobile switching center 26 without loss of information transfer in the event that signaling gateway 16 suffers a failure. Radio node controller 18 will not see a switch from one signaling gateway to another as all it knows is that it continues to communicate with mobile switching center 26 upon receiving and sending the appropriate reference values within the transferred information. Signaling gateway 16 avoids the necessity in conventional systems of terminating the information transport at various stages of the connection and maintaining the connection state of the information.

Thus, it is apparent that there has been provided, in accordance with the present invention, a system, device, and method for interworking between a SS7 network and an Internet Protocol network that satisfies the advantages set forth above. Although the present invention has been described in detail, it should be understood that various changes, substitutions, and alterations may be made herein. For example, though discussed with reference to asynchronous transfer mode permanent virtual circuits, any type of link that can uniquely identify each radio node controller may also be implemented. Other examples may be readily ascertainable by those skilled in the art and may be made herein without departing from the spirit and scope of the present invention as defined by the following claims.

What is claimed is:

1. A system for interworking between a SS7 broadband network and an Internet Protocol network to provide transport of connection oriented information, comprising:
   a radio node controller in the SS7 network operable to generate SS7 formatted information for transport in an Asynchronous Transfer Mode Permanent Virtual Circuit in response to communications with a mobile unit;
   a signaling gateway operable to receive the SS7 formatted information carried in the Asynchronous Transfer Mode Permanent Virtual Circuit from the radio node controller, the signaling gateway operable to map the SS7 formatted information into Internet Protocol information the signaling gateway operable to transport the Internet Protocol formatted information in an Stream Control Transmission Protocol stream associated with the Asynchronous Transfer Mode Permanent Virtual Circuit;
   a mobile switching center in the Internet Protocol network operable to receive the Internet Protocol formatted information on the Stream Control Transmission Protocol stream; and
   wherein the signaling gateway includes a table defining an association between Asynchronous Transfer Mode Permanent Virtual Circuits and Stream Control Transmission Protocol streams.

2. The system of claim 1, wherein the SS7 format information includes a reference value identifying a connection between the radio node controller and the mobile switching center.

3. The system of claim 2, wherein the reference value is generated by the mobile switching center during establishment of the connection.

4. The system of claim 3, wherein the mobile switching center transports the Internet Protocol formatted response information over a Stream Control Transmission Protocol stream associated with the radios node controller.

5. The system of claim 4, wherein the signaling gateway is operable to receive the Internet Protocol formatted response information over the Stream Control Transmission Protocol stream associated with the radio node controller, the signaling gateway operable to map the IP formatted response information into SS7 formatted response information.

6. The system of claim 5, wherein the signaling gateway transports the SS7 formatted response information on the asynchronous transfer mode permanent virtual circuit corresponding to the radio node controller.

7. The system of claim 1, wherein the mobile switching center is operable to generate Internet Protocol formatted response information in response to receipt of the Internet Protocol formatted request information.

8. The system of claim 7, wherein the mobile switching center includes a table defining an association between Stream Control Transmission Protocol streams and radio node controllers.

9. The system of claim 7, wherein the Internet Protocol formatted response information includes a reference value identifying a connection established between the radio node controller and the mobile switching center.

10. A method for interworking between a broadband SS7 network and an Internet Protocol network to provide transport of connection oriented information, comprising:
    receiving SS7 formatted request information on an Asynchronous Transfer Mode Permanent Virtual Circuits;
    mapping the SS7 formatted request information into Internet Protocol formatted response information;
    transporting the Internet Protocol formatted request information on a Stream Control Transmission Protocol stream associated with the Asynchronous Transfer Mode Permanent Virtual Circuits; and
    maintaining associations between Asynchronous Transfer Mode Permanent Virtual Circuits and Stream Control Transmission Protocol streams in a table stored in a signaling gateway.

11. The method of claim 10, further comprising:
    receiving Internet Protocol formatted response information on Stream Control Transmission Protocol stream in response to the Internet Protocol formatted request information;
    mapping the Internet Protocol formatted response information into SS7 formatted response information;
    transporting the SS7 formatted response information on an Asynchronous Transfer Mode Permanent Virtual Circuits associated with the Stream Control Transmission Protocol stream.

12. The method of claim 11, wherein the Stream Control Transmission Protocol stream is associated with an originator of the SS7 formatted request information.

13. The method of claim 11, wherein the SS7 formatted request information includes a reference value associated with a connection for transporting the Internet Protocol formatted request information.

14. A device for interworking between a broadband SS7 network and an Internet Protocol network to provide transport of connection oriented information, comprising:
a signaling gateway operable to receive SS7 formatted request information on an Asynchronous Transfer Mode Permanent Virtual Circuits, the signaling gateway operable to map the SS7 formatted request information into Internet Protocol formatted request information, the signaling gateway including a table to maintain associations between the Asynchronous Transfer Mode Permanent Virtual Circuits and a Stream Control Transmission Protocol stream, and the signaling gateway operable to transport the Internet Protocol formatted request information on the Stream Control Transmission Protocol stream associated with the Asynchronous Transfer Mode Permanent Virtual Circuits.

15. The device of claim 14, wherein the signaling gateway is operable to receive Internet Protocol formatted response information on the Stream Control Transmission Protocol stream in response to the Internet Protocol formatted request information.

16. The device of claim 15, wherein the signaling gateway is operable to map the Internet Protocol formatted response information into SS7 formatted response information, the signaling gateway operable to transport the SS7 formatted response information on the Asynchronous Transfer Mode Permanent Virtual Circuits associated with the Stream Control Transmission Protocol stream.

17. The device of claim 15, wherein the SS7 formatted request information includes a reference value identifying a connection for the SS7 formatted and Internet Protocol formatted request information and the Internet Protocol formatted and SS7 formatted response information.

18. A device for interworking between a broadband SS7 network and an Internet Protocol network to provide transport of connection oriented information, comprising:
means for receiving SS7 formatted request information on an Asynchronous Transfer Mode Permanent Virtual Circuits;
means for mapping the SS7 formatted request information into Internet Protocol formatted response information;
means for transporting the Internet Protocol formatted request information on a Stream Control Transmission Protocol stream associated with the Asynchronous Transfer Mode Permanent Virtual Circuits; and
means for maintaining associations between Asynchronous Transfer Mode Permanent Virtual Circuits and Stream Control Transmission Protocol streams.

19. The device of claim 18, further comprising:
means for receiving Internet Protocol formatted response information on Stream Control Transmission Protocol stream in response to the Internet Protocol formatted request information;
means for mapping the Internet Protocol formatted response information into SS7 formatted response information;
means for transporting the SS7 formatted response information on an Asynchronous Transfer Mode Permanent Virtual Circuits associated with the Stream Control Transmission Protocol stream.

20. The method of claim 18, wherein the Stream Control Transmission Protocol stream is associated with an originator of the SS7 formatted request information.

21. The device of claim 18, wherein the SS7 formatted request information includes a reference value associated with a connection for transporting the Internet Protocol formatted request information.

22. A computer readable medium including code for interworking between a broadband SS7 network and an Internet Protocol network to provide transport of connection oriented information, the code operable to perform a process comprising:
receiving SS7 formatted request information on an Asynchronous Transfer Mode Permanent Virtual Circuits;
mapping the SS7 formatted request information into Internet Protocol formatted response information;
storing an association between the Asynchronous Transfer Mode Permanent Virtual Circuit and a Stream Control Transmission Protocol stream in a table on a signaling gateway; and
transporting the Internet Protocol formatted request information on the Stream Control Transmission Protocol stream associated with the Asynchronous Transfer Mode Permanent Virtual Circuit.

23. The computer readable medium of claim 22, wherein the code is further to:
receiving Internet Protocol formatted response information on Stream Control Transmission Protocol stream in response to the Internet Protocol formatted request information;
mapping the Internet Protocol formatted response information into SS7 formatted response information;
transporting the SS7 formatted response information on an Asynchronous Transfer Mode Permanent Virtual Circuits associated with the Stream Control Transmission Protocol stream.

\* \* \* \* \*